United States Patent
Yamamoto (10) Patent No.: US 11,964,643 B2
(45) Date of Patent: Apr. 23, 2024

(54) VEHICLE BRAKING DEVICE

(71) Applicant: ADVICS CO., LTD., Kariya (JP)

(72) Inventor: Takayuki Yamamoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 414 days.

(21) Appl. No.: 17/288,047

(22) PCT Filed: Nov. 18, 2019

(86) PCT No.: PCT/JP2019/045013
§ 371 (c)(1),
(2) Date: Apr. 23, 2021

(87) PCT Pub. No.: WO2020/105572
PCT Pub. Date: May 28, 2020

(65) Prior Publication Data
US 2021/0323525 A1  Oct. 21, 2021

(30) Foreign Application Priority Data

Nov. 19, 2018  (JP) ................. 2018-216386

(51) Int. Cl.
  *B60T 13/68*  (2006.01)
  *B60T 8/36*   (2006.01)
  *B60T 11/224* (2006.01)

(52) U.S. Cl.
  CPC ........... *B60T 13/686* (2013.01); *B60T 8/363* (2013.01); *B60T 11/224* (2013.01)

(58) Field of Classification Search
  CPC . B60T 7/042; B60T 8/17; B60T 8/363; B60T 11/224; B60T 13/686;
  (Continued)

(56) References Cited

U.S. PATENT DOCUMENTS 3,448,230 A * 6/1969 Bueler .............. B60T 17/226
                                                    200/82 D
7,673,948 B2 * 3/2010 Otomo ............. B60T 8/4081
                                                    303/114.1
(Continued)

FOREIGN PATENT DOCUMENTS

JP       2000190839 A     7/2000

OTHER PUBLICATIONS

International Search Report (PCT/ISA/210) and Written Opinion (PCT/ISA/237) dated Dec. 10, 2019, by the Japan Patent Office as the International Searching Authority for International Application No. PCT/JP2019/045013.

*Primary Examiner* — Matthew W Jellett
(74) *Attorney, Agent, or Firm* — BUCHANAN INGERSOLL & ROONEY PC (57) ABSTRACT

A vehicle braking device provided with a hydraulic circuit having a first system, a second system, and a connection flow channel connecting both systems. The vehicle braking device includes a fluid supply unit supplying fluid to the first system, a first braking unit, for applying a braking force to a first wheel by using the fluid flowing in the first system, a second braking unit, for applying a braking force to a second wheel by using the fluid flowing in the second system, a determination unit for determining whether the fluid is leaking from the second system, and a control unit for executing specific control for controlling the fluid supply unit so that an amount of fluid supplied to the first system is increased in response to determination by the determination unit that the fluid is leaking from the second system.

4 Claims, 2 Drawing Sheets (58) Field of Classification Search
CPC .... B60T 13/166; B60T 13/168; B60T 17/221;
B60T 2270/402
USPC ..................................... 251/129.15; 303/9.63
See application file for complete search history.

(56) References Cited

U.S. PATENT DOCUMENTS

| | | | |
|---|---|---|---|
| 7,976,109 B2* | 7/2011 | Reuter | B60T 7/042 |
| | | | 303/3 |
| 8,348,351 B2* | 1/2013 | Kanagawa | B60T 8/441 |
| | | | 303/114.1 |
| 8,888,197 B2* | 11/2014 | Miyazaki | B60T 8/94 |
| | | | 303/122.1 |
| 2012/0038209 A1* | 2/2012 | Yamamoto | B60T 17/225 |
| | | | 303/9.63 |
| 2012/0126610 A1* | 5/2012 | Nakata | B60T 13/686 |
| | | | 303/9.63 |
| 2012/0235469 A1* | 9/2012 | Miyazaki | B60T 8/94 |
| | | | 303/6.01 |
| 2021/0323525 A1* | 10/2021 | Yamamoto | B60T 17/221 |

\* cited by examiner

VEHICLE BRAKING DEVICE

TECHNICAL FELD

The present disclosure relates to a vehicle braking device.

BACKGROUND ART

A vehicle braking device is a device for controlling a braking force applied to a vehicle, for example, by controlling a hydraulic pressure of a wheel cylinder. The hydraulic pressure of the wheel cylinder is controlled by controlling the flow of fluid in the vehicle braking device. When fluid leakage occurs in a flow channel of the fluid, various measures are taken. For example, in a braking system described in JP-A-2000-190839, when fluid leakage occurs at a piping between a supply source of fluid and a wheel cylinder, the control is performed so that a solenoid valve arranged between the both is closed.

CITATION LIST

Patent Literature

PTL 1: JP-A-2000-190839

SUMMARY

Technical Problem

It is required to further improve the responsiveness of the braking force in the measures taken when the fluid leakage occurs. Accordingly, the present inventors have noticed that hydraulic-pressure transmission routes of the fluid have a system in which the hydraulic pressure is transmitted to wheel cylinders of first wheels and a system in which the hydraulic pressure is transmitted to wheel cylinders of second wheels, and have developed a new configuration capable of improving the responsiveness at the occurrence of fluid leakage.

The present disclosure has been made in view of the above circumstances, and an object thereof is to provide a vehicle braking device capable of improving the responsiveness of the braking force in the case where fluid leakage occurs.

Solution to Problem

A vehicle braking device according to the present disclosure which is provided with a hydraulic circuit having a first system, a second system, and a connection flow channel connecting the first system and the second system includes a fluid supply unit configured to supply fluid co the first system, a first braking unit configured to apply a braking force to a first wheel by using the fluid flowing in the first system, a second braking unit configured to apply a braking force to a second wheel by using the fluid flowing in the second system, a determination unit configured to determine whether the fluid is leaking from the second system, and a control unit configured to execute specific control for controlling the fluid supply unit so that an amount of fluid supplied to the first system is increased in response to determination that the fluid is leaking from the second system by the determination unit.

Advantageous Effects

According to the present disclosure, when fluid leakage occurs in the second system, the amount of fluid supplied to the first system is increased and the braking force applied to the first wheels can be increased further earlier by executing the specific control. That is, the braking force is secured earlier in the system where fluid leakage does not occur to thereby improve the responsiveness of the braking force according to the present disclosure.

DESCRIPTION OF EMBODIMENTS

Figure 1:
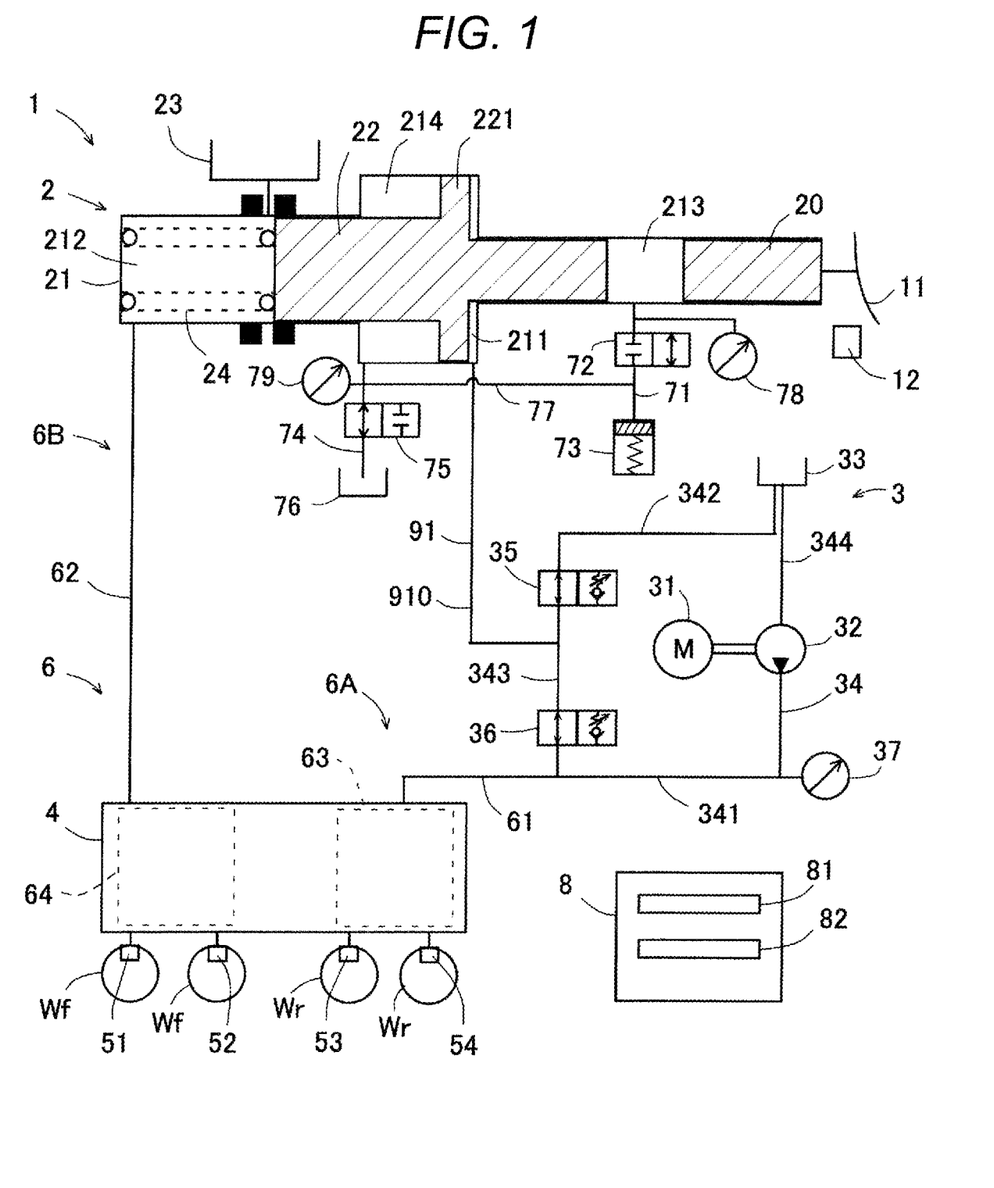
FIG. 1 is a configuration diagram of a vehicle braking device according to the embodiment.

Hereinafter, an embodiment of the present disclosure will be explained with reference to the drawings. Respective drawings used for explanation are schematic drawings, and shapes of respective parts are not strictly drawn. A vehicle braking device 1 according to the embodiment includes a master cylinder 2, a fluid supply unit 3, an actuator 4, wheel cylinders 51, 52, 53, and 54, a hydraulic circuit 6, and a brake ECU 8 as shown in FIG. 1. The hydraulic circuit 6 has a first system 6A, a second system 6B, and a connection flow channel 91 connecting the first system 6A and the second system 6B as described later.

The master cylinder 2 is a device configured to supply fluid to the wheel cylinders 51, 52 of front wheels Wf. The master cylinder 2 includes an input piston 20, a cylinder 21, a master piston (corresponding to a "piston") 22, a reservoir 23, and a spring 24. The input piston 20 is a piston member, sliding inside the cylinder 21 in conjunction with an operation of a brake pedal 11 as a brake operation member. The vehicle braking device 1 is provided with a stroke sensor 12 for detecting a stroke of the brake pedal 11.

The cylinder 21 is a cylinder member in which an internal space is defined into an input chamber 211 and an output chamber 212 by the master piston 22. More specifically, the input chamber 211, the output chamber 212, a reaction force chamber 213, and a regulation chamber 214 are formed inside the cylinder 21. The input chamber 211 and the output chamber 212 are described later.

The reaction force chamber 213 is defined by the input piston 20 and the master piston 22. The master piston 22 and the input piston 20 are disposed so as to face each other and apart from each other by a predetermined distance, namely, through the reaction force chamber 213. The reaction force chamber 213 is connected to a stroke simulator 73 through a flow channel 71 and a normally closed type solenoid valve 72. A reaction force with respect to forward movement of the input piston 20 as a hydraulic pressure of the reaction force chamber 213 is formed b the stroke simulator 73 in an opened state of the solenoid valve 72. A pressure sensor 78 connected to the flow channel 71 detects a reaction force pressure as a hydraulic pressure of the reaction force chamber 213 and a pedaling force of a driver with respect to the brake pedal 11.

The regulation chamber 214 is defined by the master piston 22. The regulation chamber 214 is formed so that a volume is reduced when the master piston 22 moves forward and that the volume is increased when the master piston 22 moves backward. The regulation chamber 214 is connected to a reservoir 76 through a flow channel 74 and a normally-open type solenoid valve 75. A portion in the flow channel 74 between the solenoid valve 75 and the regulation chamber 214 is connected to a portion in the flow channel 71 between the solenoid valve 72 and the stroke simulator 73 through a flow channel 77. A pressure sensor 79 connected to the flow channel 77 detects a hydraulic pressure of the regulation chamber 214.

The master piston 22 is a piston member disposed inside the cylinder 21. The master piston 22 slides inside the cylinder 21 so as to change a volume of the output chamber 212, which is driven by a force corresponding to a hydraulic pressure in the input chamber 211 to thereby generate a hydraulic pressure (hereinafter referred to as a "master pressure") in the output chamber 212. The master piston 22 has a large-diameter part 221 formed to be larger in diameter than other portions so as to separate the input chamber 211 and the regulation chamber 214.

The input chamber 211 is a so-called servo chamber, which is formed behind the large-diameter part 221 of the master piston 22. The input chamber 211 is formed to face the regulation chamber 214 through the large-diameter part 221. A hydraulic pressure in the input chamber 211 (hereinafter referred to as a "servo pressure") will be a drive force for pressing a rear end face of the large-diameter part 211 and moving the master piston 22 forward. The fluid supply unit 3 is connected to the input chamber 211 through the later-described connect connection flow channel 91.

The output chamber 212 is so-called master chamber, which is formed on a bottom side of the cylinder 21, namely, in front of the master piston 22. The output chamber 212 formed so that a volume is reduced when the master piston 22 moves forward and that the volume is increased when the master piston 22 moves backward. The output chamber 212 is connected to the actuator 4 through a second flow channel 62.

As described above, the master cylinder 2 includes the cylinder 21 and the master piston 22 arranged slidably inside the cylinder 21 and the input chamber 211 and the output chamber 212 defined by the master piston 22 are formed inside the cylinder 21.

The reservoir 23 is a tank storing fluid, which is kept in atmospheric pressure. A flow channel connecting the reservoir 23 and the output chamber 212 communicates when the master piston 22 is in an initial position and is blocked when the master piston 22 moves forward by a predetermined distance from the initial position. The initial position is a position where the master piston 22 in the backmost position. The spring 24 presses the master piston 22 toward the initial position (namely, backward). In a case where a failure occurs in a power supply, the solenoid valve 72 is closed and the solenoid valve 75 is opened. Accordingly, the reaction force chamber 213 is sealed, the regulation chamber 214 communicates with the reservoir 76, and the master piston 22 moves forward in accordance with the forward movement of the input piston 20. That is, the master pressure can be generated only by the pedaling force of the driver in this state.

The fluid supply unit 3 is a device for supplying fluid to a first flow channel 61. The first flow channel 61 is connected to a first hydraulic circuit 63 inside the actuator 4. Therefore, the fluid supplied to the first flow channel 61 flows, into the first hydraulic circuit 63. The first hydraulic circuit 63 is connected to the wheel cylinders 53, 54. The connection flow channel 91 is a flow channel connecting the first flow channel 61 and the input chamber 211 of the master cylinder 2. When a later-described second solenoid valve 36 is in an open state or the second solenoid valve 36 does not exist, the fluid supplied by the fluid supply unit 3 is supplied to the first hydraulic circuit 63 and the input chamber 211.

A transmission route of the hydraulic pressure from the fluid supply unit 3 to the wheel cylinders 51 to 54, that is, the hydraulic circuit 6 includes the first system 6A, connected to the wheel cylinders 53, 54 of rear wheels Wr, the second system 6B connected to the wheel cylinders 51, 52 of the front wheels Wf, and the connection flow channel 91 connecting the first system 6A and the second system 6B. The first system 6A includes the first flow channel 61 and the first hydraulic circuit 63. The second system 6B includes the master cylinder 2, the second flow channel 62, and a second by hydraulic circuit 64 inside the actuator 4. The second hydraulic circuit 64 is connected to the wheel cylinders 51, 52. As described above, the vehicle braking device 1 includes the fluid supply unit 3, the first system 6A connecting the fluid supply unit 3 and the rear wheels Wr corresponding to first wheels, the second system 6B connected to the front wheels Wf corresponding to second wheels, and the connection flow channel 91 connecting the first system 6A and the second system 6B. The fluid supply unit 3 is a device supplying fluid to the first system 6A. The wheel cylinders 53, 54 correspond to a device (first braking unit) applying a braking force to the rear wheels Wr by using the fluid flowing in the first system 6A. The wheel cylinders 51, 52 correspond to a device (second braking unit) applying a braking force to the front wheels Wf by using the fluid flowing in the second system 6B.

The fluid supply unit 3 includes a motor 31, a pump 32, a reservoir 33, an annular flow channel 34, a first solenoid valve 35, and the second solenoid valve 36. The motor 31 is drive-controlled by the brake ECU 8, which drives the pump 32. The pump 32 is, for example, a gear pump, which is driven by a drive force of the motor 31. As the pump 32, well-known pumps such as a piston pump may be used in addition to the gear pump. The pump 32 sucks fluid stored in the reservoir 33 and discharges the fluid to the first flow channel 61 and the connection flow channel 91. The annular flow channel 34 is a flow channel connecting a discharge port and a suction port of the pump 32, which is configured by flow channels 341, 342, 343, and 344.

The flow channel 341 connects the discharge port of the pump 32 to the first flow channel 61 and the connection flow channel 91. The flow channel 342 connects the connection flow channel 91 and the reservoir 33. On the flow channel 342, the first solenoid valve 35 is provided. The flow channel 343 is a portion connecting the flow channel 341 and the flow channel 342 in the connection flow channel 91. That is, the connection flow channel 91 is configured by a flow channel 910 connecting the input chamber 211 and the annular flow channel 34, and the flow channel 343 as part of the annular flow channel 34. The second solenoid valve 36 is provided on the flow channel 343, namely, part of a define of the connection flow channel 91. The flow channel 344 connects the reservoir 33 and the suction port of the pump 32.

A pressure sensor 37 for detecting a hydraulic pressure in the flow channel 341 and the first flow channel 61 is provided on the flow channel 341. The hydraulic pressure detected by the pressure sensor 37 can be regarded as a hydraulic pressure supplied to the first hydraulic circuit 63 and the connection flow channel 91 by the pump 32. The servo pressure as the hydraulic pressure of the input chamber 211 varies according to a control state of the second solenoid valve 36. In the embodiment, the reservoir 33, the reservoir 16, and the reservoir 23 are configured by one common reservoir (for example, the reservoir 23).

The first solenoid valve 35 and the second solenoid valve 36 are normally-open type solenoid valves, which are linear valves capable of controlling a differentia pressure between upstream and downstream. The first solenoid valve 35 and the second solenoid valve 36 set the hydraulic pressure on the upstream side to be higher than the hydraulic pressure on the downstream side based on the magnitude of control current from the brake ECU 8. A target differential pressure of the first solenoid valve 35 and the second solenoid valve 36 is determined according to the magnitude of the control current. The first solenoid valve 35 and the second solenoid valve 36 can form a throttled state in the flow channel according to the control current.

As described above, the fluid supply part 3 includes the motor 31 and the pump 32 supplying fluid to the first system 6A at a discharge amount corresponding to the rotation speed of the motor 31. The connection flow channel 91 is connected to the input chamber 211 and the second system 6B is connected to the output chamber 212.

The brake ECU 8 sets a target wheel pressure with respect to the stroke, then, controls the target differential pressure of the first solenoid valve 35 and drives the pump 32. Accordingly, a hydraulic pressure on the upstream side (the pump 32 side) of the first solenoid valve 35 can be set higher than a hydraulic pressure in the reservoir 33 (atmospheric pressure in this case) as a hydraulic pressure on the downstream side of the first solenoid valve 35 by the target differential pressure. The brake ECU 8 also controls the target differential pressure of the second solenoid valve 36 and drives the pump 32 when different hydraulic pressures are generated in respective systems 6A, 6B without using the actuator 4. Accordingly, a hydraulic pressure on the upstream side (pump 32 side) of the second solenoid valve 36 can be set higher than a hydraulic pressure in the flow channel between the second solenoid valve 36 and the first solenoid valve 35 as the downstream side of the second solenoid valve 36, namely, the servo pressure by the target differential pressure.

The brake ECU 8 controls the first solenoid valve 35 and does not control the second solenoid valve 36 when the same wheel pressure is generated in the front and rear wheels Wf, Wr. The second solenoid valve 36 is used when controlling the hydraulic pressure in the wheel cylinders 51, 52 of the front wheels Wf to be lower than the hydraulic pressure in the wheel cylinders 53, 54 of the rear wheels Wr, for example, in consideration of a regenerative braking force to be generated in the front wheels Wf.

Figure 2:
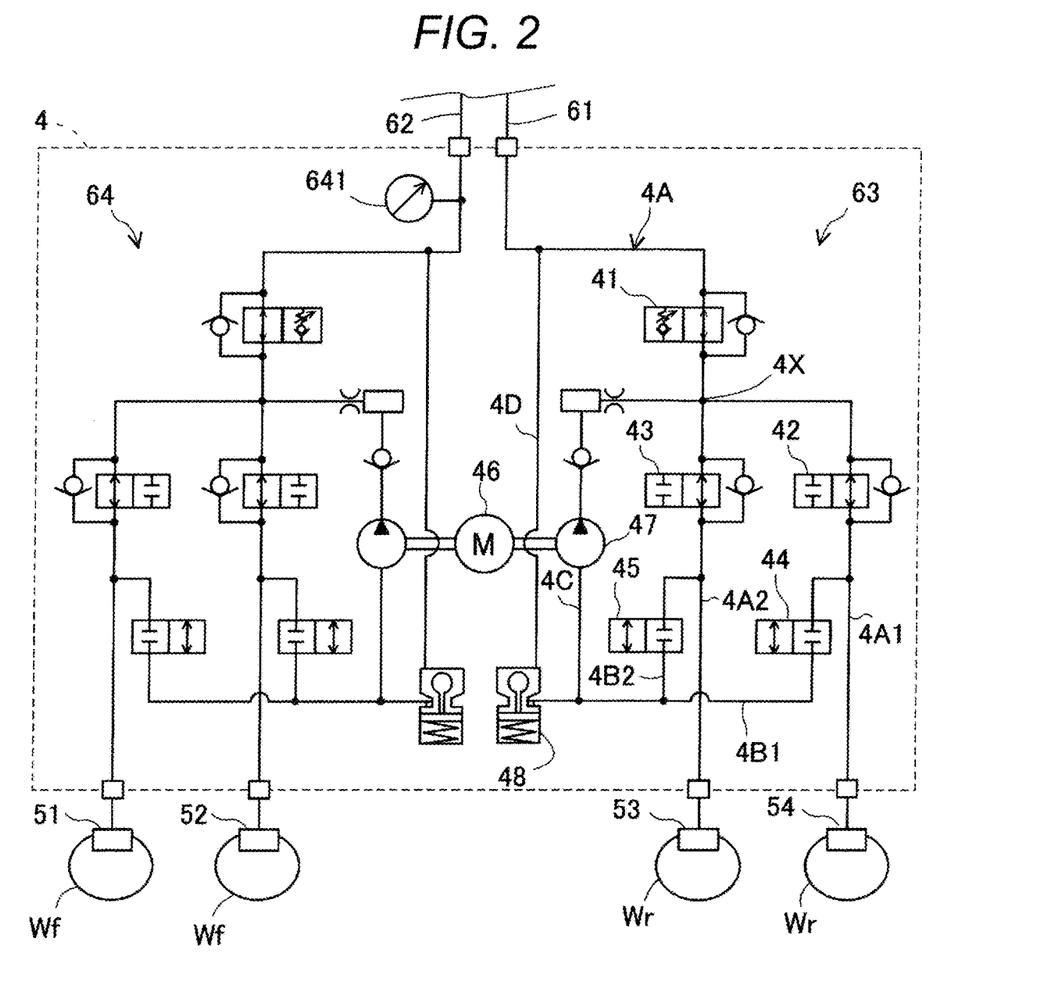
FIG. 2 is a configuration diagram of an actuator according to the embodiment.

The actuator 4 is a so-called ESC actuator configured so as to increase respective wheel pressures. The actuator 4 includes the first hydraulic circuit 63, the second hydraulic circuit 64, solenoid valves 41 to 45, a motor 46, pumps 47, and pressure regulating reservoirs 48. When the brake ECU 8 controls the solenoid valves 41 to 45 and the pumps 47 arranged respective hydraulic circuits 63, 64, thereby increasing, reducing, or keeping respective wheel pressures. The actuator 4 may also execute antiskid control or sideslip prevention control based on a command from the brake ECU 8. A pressure sensor 641 for detecting the master pressure is provided at the second hydraulic circuit 64 or on the second flow channel 62.

The configuration of the actuator 4 will be explained by using the first hydraulic circuit 63 as an example. A flow channel 4A is a flow channel connecting the first flow channel 61 and the wheel cylinders 53, 54. The flow channel 4A branches off into a flow channel 4A1 and a flow channel 4A2 at a branch point 4X. The flow channel 4A1 is connected to the wheel cylinder 54, and the flow channel 4A2 is connected to the wheel cylinder 53. The solenoid valve 41 is a normally-open type linear valve provided at a portion on the upstream side of the branch point 4X on the flow channel 4A. The differential pressure between upstream and downstream can be controlled so that the pressure becomes high on the side of the branch point 4X by the solenoid valve 41.

The solenoid valve 42 a normally-open type linear valve provided on the flow channel 4A1. The solenoid valve 43 is a normally-open type linear valve provided on the flow channel 4A2. The solenoid valve 44 is a normally-closed type on-off valve provided on a flow channel 4B1. The flow channel 4B1 is a flow channel connecting a portion between the solenoid valve 42 and the wheel cylinder 54 on the flow channel 4A1, and the pressure-regulating reservoir 48. The solenoid valve 45 is a normally-closed type on-off valve provided on a flow channel 4B2. The flow channel 4B2 is a flow channel connecting a portion between the solenoid valve 43 and the wheel cylinder 53 on the flow channel 4A2, and the pressure-regulating reservoir 48. When the solenoid valves 44, 45 are opened, the wheel pressures can be reduced. The solenoid valves 42, 43 may be on-off valves.

The pump 47 is provided on a flow channel 4C, which is driven by driving the motor 46. The flow channel 4C is a flow channel connecting the pressure-regulating reservoir 48 and the branch point 4X. The pressure-regulating reservoir 48 is connected to the first flow channel 61 by a flow channel 4D. When the pump 47 is driven, fluid is sucked from the pressure-regulating reservoir 48 and discharged toward the branch point 4X. For example, when the hydraulic pressure of the wheel cylinder 54 is reduced by the antiskid control, the brake ECU 8 drives the pump 47, closes the solenoid valve 42, and opens the solenoid valve 44.

The brake ECU 8 drives the pump 47 and controls the target differential pressure of the solenoid valve 41 at the time of increasing the wheel pressure by the actuator 4. Accordingly, a hydraulic pressure at a portion on the side of the branch point 4X of the solenoid valve 41 in the flow channel 4A is increased according to the target differential pressure of the solenoid valve 41. When the actuator 4 is not activated, the fluid supplied from the fluid supply part 3 is supplied to the wheel cylinders 53, 54 through the flow channel 4A. The same applies to the configuration in the second a hydraulic circuit 64. The fluid is supplied to the second hydraulic circuit 64 through the master cylinder 2 and the second flow channel 62.

The brake ECU 8 is an electronic control unit including a CPU, a memory, and the like. The brake ECU 8 is a device controlling mainly the fluid supply unit 3 and the actuator 4 based on information from various sensors. When the brake pedal 11 is operated, the brake ECU 8 sets a target deceleration and the target wheel pressure in accordance with the stroke and/or the pedaling force. The brake ECU 8 also opens the solenoid valve 72 and closes the solenoid valve 75 when the brake pedal 11 is operated. Accordingly, channel between the regulation chamber 214 and the reservoir 76 is blocked and the reaction force chamber 213 and the regulation chamber 214 communicate with the stroke simulator 73. A hydraulic pressure corresponding to the operation of the brake pedal 11 is generated in the reaction force chamber 213 and the regulation chamber 214.

The brake ECU 8 controls the pump 32 and the first solenoid valve 35 in the fluid supply 3 in accordance with the target wheel pressure when the regenerative braking force is not generated. In this case, the second solenoid valve 36 is not controlled and the opened state due to non-conduction is maintained. The brake ECU 8 drives the pump 32 and sets the target differential pressure of the first solenoid valve 35 so as to correspond to the target wheel pressure, applying control current corresponding to the target differential pressure to the first solenoid valve 35.

The pump 32 sucks fluid from the reservoir 33 and supplies the fluid to the first system 6A. The fluid discharged from the pump 32 is also supplied to the input chamber 211 through the connection flow channel 91. A hydraulic pressure corresponding to the target differential pressure of the first solenoid valve 35 is generated in the input chamber 211 and the first system 6A.

When the servo pressure is increased by the above control, the master piston 22 moves forward, and the master pressure is increased due to contraction of the output chamber 212. That is, the hydraulic pressure in the second flow channel 62 and the second hydraulic circuit 64 connected to the output chamber 212 is also increased. According to the control of the pump 32 and the first solenoid valve 35, a hydraulic pressure corresponding to the servo pressure is generated at respective wheel cylinders 51 to 54 through the both systems 6A, 6B. Accordingly, the brake ECU 8 executes braking control so as to achieve the target wheel pressure and achieve the target deceleration. Strictly, the hydraulic pressure in the second system 6B is slightly lower than the hydraulic pressure in the first system 6A due to sliding resistance and the like of the master piston 22. In vehicles having a regenerative braking device such as hybrid vehicles, the target differential pressure of the second solenoid valve 36 is controlled so that the target deceleration (target braking force) of the front wheels Wf is achieved by a sum of the regenerative braking force and the hydraulic braking force. The brake ECU 8 estimates respective wheel pressures based on detected values of the pressure sensors 37, 641 and a control state of the actuator 4.

Specific Control

The vehicle braking device 1 according to the embodiment is configured to execute specific control in a case where fluid leakage occurs in the second system 6B. The brake ECU 8 includes a determination unit 81 and a control unit 82 as functions relating to the specific control. The determination unit 81 determines whether fluid is leaking from the second system 6B. Specifically, the determination unit 81 determines occurrence of fluid leakage based on a hydraulic pressure of the first system 6A and a hydraulic pressure of the second system 6B, namely, a detection result of the pressure sensor 37 and a detection result of the pressure sensor 641.

The hydraulic pressures of respective systems 6A, 6B generated by control of the pump 32 and the first solenoid valve 35 will be explained on the assumption that target wheel pressures of the front and rear wheels Wf, Wr are set to the same pressure. When fluid leakage does not occur in the second system 6B, the hydraulic pressure detected at the pressure sensor 641 corresponds to a value obtained by subtracting a predetermined pressure from the hydraulic pressure detected at the pressure sensor 37. The predetermined pressure is a value corresponding to sliding resistance of the master piston 22.

On the other hand, when fluid leakage occurs in the second system 6B, hydraulic pressures are hardly increased in both systems 6A, 6B until becoming in a prescribed state as the first system 6A and the second system 6B are connected by the connection flow channel 91. After becoming in the prescribed state, only the hydraulic pressure of the first system 6A is increased, and a difference between the detection result of the pressure sensor 641 and the detection result of the pressure sensor 37 becomes larger than the predetermined pressure. The prescribed state means a state in which the master piston 22 is in a bottoming state. The determination unit 81 thus determines a failure of the second system 6B based on the hydraulic pressures of respective systems 6A, 6B. The more detailed explanation relating to the determination will be made later.

The control unit 82 executes specific control in which the fluid supply unit 3 is controlled so as to increase a fluid supply amount to the first system 6A in accordance with determination that fluid is leaking from the second system 6B by the determination unit 81. The fluid supply amount means, for example, a fluid amount per a unit time supplied to the first hydraulic circuit 63.

More specifically, the control unit 82 increases the rotation speed of the motor 31, namely, a discharge amount of the pump 32 as the specific control. The fluid supplied to the first system 6A is also supplied to the input chamber 211 through the connection flow channel 91. When the fluid is supplied to the input chamber 211, the master piston 22 moves forward. Here, when fluid leakage occurs in the second system 6B, for example, in the second flow channel 62, the fluid pushed to the second flow channel 62 from the output chamber 212 by the forward movement of the master piston 22 leaks; therefore, the master pressure and the hydraulic pressure of the second system 618 are not increased.

As the master pressure is not increased, the master piston 22 moves forward without resistance due to the hydraulic pressure in accordance with the supply of fluid to the input chamber 211. Accordingly, the volume of the output chamber 212 is reduced without large reaction force, and the volume of the input chamber 211 is increased without large reaction force at the same time. During expansion of the input chamber 211, the servo pressure and the hydraulic pressure in the first system 6A are hardly increased. That is, the hydraulic pressure is hardly generated in both systems 6A, 6B during forward movement of the master piston 22.

The determination unit 81 can determine that the fluid is leaking from the second system 6B when the hydraulic pressure in the second system 6B (namely, a detected value of the pressure sensor 641) does not follow the increase in the target wheel pressure (or a target upstream pressure) beyond an allowable delay range. When the determination unit 81 determines that fluid leakage occurs, the brake ECU 8 turns on a warning lamp to notify the driver that an abnormality occurs.

On the other hand, the detected value of the pressure sensor 641 is increased properly following the target wheel pressure, the determination unit 81 can determine that the fluid is not leaking from the second system 63. The brake ECU 8 executes normal control in accordance with the braking operation by the driver when determined that the fluid leakage does not occur. In the normal control, the discharge amount of the pump 32 is set to a discharge amount previously set based on the target wheel pressure.

The determination unit 81 according to the embodiment sets the target wheel pressure for inspection and executes automatic pressurization after the ignition is turned off, to determine fluid leakage. In this case, the determination unit 81 determines the fluid leakage based on comparison between the hydraulic pressure of the first system 6A and the hydraulic pressure of the second system 63 after the hydraulic pressure in the first system 6A reaches the target wheel pressure. The determination unit 81 determines that the fluid is leaking when the difference between the both hydraulic pressures is larger than a predetermined pressure.

Figure 3:
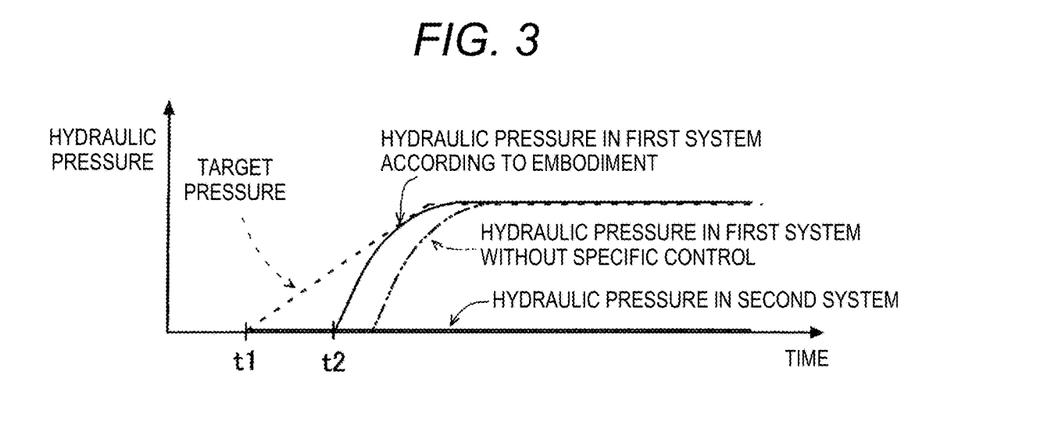
FIG. 3 is an explanatory view for explaining specific control according to the embodiment.

Referring to FIG. 3, the case where the specific control is executed will be explained. In the embodiment, in the case where the occurrence of the fluid leakage in the second system 6B is determined, the specific control is executed by the control unit 82 when the brake pedal is operated and the target pressure (target wheel pressure) set at "t1". When the specific control is executed, the discharge amount of the pump 32 becomes higher than the discharge amount at the time of normal control. Accordingly, the supply amount of fluid supplied to the input chamber 211 is increased and the master piston 22 moves forward faster than during the normal control. Therefore, a period of time ("t1" to "t2") from the driving of the master piston 22 until the bottoming becomes shorter than a case where the specific control is not executed. That is, the master piston 22 abuts on a bottom (front end) of the cylinder 21 earlier than during the normal control.

When the master piston 22 becomes in the bottoming state "t2", the volume of the output chamber 212 becomes the minimum in a volume variation range thereof and the volume of the input chamber 211 becomes the maximum in a volume variation range thereof. That is, the input chamber 211 is not expanded any more, and the hydraulic pressure in the input chamber 211, namely, the servo pressure is increased as the fluid is supplied. Moreover, an escape route of fluid as the expansion of the input chamber 211 is lost; therefore, the fluid supply amount supplied from the pump 32 to the first system 6A is also increased. Accordingly, the hydraulic pressure in the first system 6A is also increased as the servo pressure is increased, which increases the hydraulic pressure in the wheel cylinders 53, 54 and generates a braking force in the rear wheels Wr. The hydraulic pressure in the second system 6B and the hydraulic pressure in the wheel cylinders 51, 52 are not increased. The respective wheel cylinders 51 to 54 are provided at not-shown disc brake devices arranged at the respect live wheels Wf, Wr. The braking force is applied to the wheels Wf, Wr by the disc brake devices in accordance with wheel pressures. It can be said that the wheel cylinders 51 to 54 apply the braking force to the wheels Wf, Wr through the disc brake devices. The brake device provided at the wheels Wf, Wr is not limited to the disc brake device, and a drum brake device may be provided.

According to the embodiment, the increase in the fluid supply amount to the first system 6A is enhanced by the specific control and the braking force can be generated earlier than during the normal control even when the second system 6B fails. In other words, even when fluid leakage occurs in the second system 6B, the fluid supply amount to the first system 6A is increased and the braking force applied to the rear wheels Wr can be increased earlier by the execution of the specific control. That is, the braking force is secured earlier in the system where fluid leakage does not occur to thereby improve the responsiveness of the braking force according to the embodiment. In the case where the second system 6B fails, the braking force is generated at the rear wheels Wr after the master piston 22 becomes in the bottoming state and a prescribed braking force is secured even when the specific control is not executed. According to the embodiment, the period of time until generation of the braking force in this case can be shortened.

Here, the control unit 82 may be configured so as to execute the specific control until the volume of the output chamber 212 becomes the minimum in response to the determination that fluid is leaking from the second system 6B by the determination unit 81. That is, the control unit 82 may be configured to end the specific control when the master piston 22 becomes in the bottoming state. Accordingly, it is possible to suppress application of a load on the pump 32 more than necessary. The configuration is also effective from viewpoints of operating noise and power consumption.

Also in this case, for example, the control unit 82 executes the specific control in a period of time set based on the maximum volume of the output chamber 212. The control unit 82 calculates or previously stores a period of time necessary until the volume of the output chamber 212 becomes the minimum based on the discharge amount of the pump 32 and the maximum volume of the output chamber 212 set in the specific control, and ends the specific control after the necessary period of time passes from the start of the specific control. The period of time based on the maximum volume of the output chamber 212 is set as a condition for ending the specific control, thereby improving the accuracy in ending the specific control by simple control. When the hydraulic pressure in the first system 6A becomes a predetermined value or more after the start of the specific control, the control unit 82 may determine that the master piston 22 is in the bottoming state and end the specific control.

Another Specific Control

Another specific control different from the above will be explained. The control unit 82 controls the second solenoid valve 36 so that the fluid amount passing through the second solenoid valve 36 is reduced in response to the determination that fluid is leaking from the second system 6B by the determination unit 81 as specific control. That is, the control unit 82 controls the second solenoid valve 36 to a valve closed side, that is, applies control current corresponding to the target differential pressure to the second solenoid valve 36 as the specific control. Accordingly, the fluid discharged from the pump 32 is not supplied to the input chamber 211 and is preferentially supplied to the first hydraulic circuit 63 until the target differential pressure is achieved in the second solenoid valve 36. In other words, the fluid supply amount to the first system 6A becomes higher than during the normal control by closing the second solenoid valve 36 even when the discharge amount of the pump 32 is not changed.

According to the configuration, the hydraulic pressure in the first system 6A can be increased before the master piston 2 becomes in the bottoming state, and the braking force can be generated at the rear wheels Wr further earlier. That is, the responsiveness of the braking force at the occurrence of fluid leakage can be improved. The wheel pressure on the rear wheels Wr will be a hydraulic pressure corresponding to the target differential pressure of the second solenoid valve 36. The control unit 82 may also control the second solenoid valve 36 to the valve closed side and increase the discharge amount of the pump 32 as specific control.

The control unit 82 controls the second solenoid valve 36 as well as the first solenoid valve 35; thereby supplying the fluid to the input chamber 211. According to the setting of the target differential pressure of the first solenoid valve (control to the valve closed side), the fluid passing through the second solenoid valve 36 flows into the input chamber 211 for regulating the differential pressure, thereby driving the master piston 22.

The control unit 82 moves the master piston 22 forward by controlling the first solenoid valve 35 while increasing the fluid supply amount to the first system 6A by controlling the second solenoid valve 36 as the specific control. The input piston 20 moves forward by the operation of the brake pedal 11 by the driver and approaches the master piston 22.

When the input piston 20 moves forward and abuts on the master piston 22, the reaction force chamber 213 is lost and the reaction force by the stroke simulator 73 is not applied to the input piston 20.

Furthermore, as the master pressure is not increased due to the fluid leakage, the reaction force with respect to the forward movement of the input piston 20 becomes smaller than during the normal control. Then, the stroke of the brake pedal 11 is easily increased and the driver comes to step on the brake pedal 11 at a stroke with a small force, which reduces controllability in the stroke by the driver. However, the master piston 22 can be moved forward by the above specific control, thereby suppressing the abutting of the input piston 20 onto the master piston 22. Accordingly, the reaction force by the reaction force chamber 213 is applied to the input piston 20 also at the occurrence of fluid leakage, thereby securing controllability in the stroke by driver and improving the responsiveness of the braking force.

Others

The present disclosure is not limited to the above embodiment. For example, the control unit 81 may constantly compare hydraulic pressures of both systems 6A, 6B and make determination of fluid leakage when the target wheel pressure is set. The determination unit 81 may determine the fluid leakage based on a degree of increase in hydraulic pressures of respective systems 6A, 6B with respect to the target wheel pressure (namely, a degree of achievement in deceleration) or based on comparison between hydraulic pressures of the both systems 6A, 6B not only after the ignition (power supply) is turned off but also at the time of an actual braking operation during travelling of the vehicle. Also in this case, the specific control executed accordance with the determination that the fluid is leaking.

The configuration can be described as follows. The vehicle braking device 1 is a device applying a first braking force to the first wheels (rear wheels Wr) connected to the first system 6A based on the hydraulic pressure in the first system 6A and applying a second braking force to the second wheels (front wheels Wf) connected to the second system 6B based on the hydraulic pressure in the second system 6B, including the pressure sensor 37 detecting the hydraulic pressure in the first system 6A, the pressure sensor 641 detecting the hydraulic pressure in the second system 6B, and the determination unit 81 determining whether fluid leakage occurs in the second system 6B based on comparison between the detected result of the pressure sensor 37 and the detected result of the pressure sensor 641.

For example, when it is not necessary to supply different hydraulic pressures to two systems 6A, 6B on the upstream side, the vehicle braking device 1 does not have to include the second solenoid valve 36. In the vehicle in which the regenerative braking force is generated at one of the front and rear wheels Wf, Wr, the first hydraulic circuit 63 or the second hydraulic circuit 64 corresponding to the wheels that generate the regenerative braking force may be connected to the output chamber 212. For example, it can be configured so that the regenerative braking force is generated at the rear wheels Wr. In this case, for example, one end of the first flow channel 61 may be connected to the flow channel 343 in the annular flow channel 34 and the other end of the first flow channel 61 may be connected to the first hydraulic circuit 63 in the configuration shown in FIG. 1. Moreover, for example, one end of the connection flow channel 91 is connected to the flow channel 341 in the annular flow channel 34 and the other end of the connection flow channel 91 is connected to the input chamber 211 in this case. Accordingly, fluid discharged from the pump 32 is supplied to the first hydraulic circuit 63 through the second solenoid valve 36 and the first flow channel 61 and is supplied to the input chamber 211 through the connection flow channel 91. The front and rear wheels Wf, Wr may be merely interchanged in FIG. 1. Also in these cases, the specific control is executed when fluid leakage occurs in the second system 6B, thereby improving the responsiveness of the braking force in the first system 6A.

Furthermore, for example, the vehicle braking device 1 does not have to include the master cylinder 2. In this case, for example, one end of the connection flow channel 91 may be connected to the first flow channel 61 and the other end may be connected to the second flow channel 62 not through the master cylinder 2. Also in this case, the responsiveness of the braking force in the first system 6A can be improved by executing the specific control. In this case, the control unit 82 controls the motor 31, for example, so that the discharge amount of the pump 32 is increased as the specific control.

An ECU actuator is used as the actuator 4 in the above embodiment; however, an ABS actuator may be used. The vehicle braking device 1 does not always have to include the actuator 4. In this case, the first system 6A does not include the first hydraulic circuit 63 and the second system 6B does not include the second hydraulic circuit 64. In this case, for example, the first flow channel 61 may be connected to respective wheel cylinders 53, 54 and the second flow channel 62 may be connected to respective wheel cylinders 51, 52. Also in this case, the wheel cylinders 51 to 54 can apply braking forces to the wheels by using the fluid flowing in the first system 6A or the second system 6B respectively corresponding to the wheel cylinders.

The vehicle braking device 1 may include a plurality of brake ECUs. For example, the vehicle braking device 1 may include a first ECU and a second ECU. In this case, for example, the first ECU controls the motor 31, the first solenoid valve 35, and the second solenoid valve 36, and the second ECU controls the actuator 4. The first ECU and the second ECU can communicate with each other. A sensor for detecting the hydraulic pressure the flow channel may be provided in the second flow channel 62.

The invention claimed is:

1. A vehicle braking device provided with a hydraulic circuit having a first system, a second system, and a connection flow channel connecting the first system and the second system, comprising:
    a fluid supply unit configured to supply fluid to the first system;
    a first braking unit configured to apply a braking force to a first wheel by using the fluid flowing in the first system;
    a second braking unit configured to apply a braking force to a second wheel by using the fluid flowing in the second system;
    a determination unit configured to determine whether the fluid is leaking from the second system;
    a control unit configured to execute specific control for controlling the fluid supply unit so that an amount of fluid supplied to the first system is increased in response to determination by the determination unit that the fluid is leaking from the second system; and
    a master cylinder having a cylinder and a piston arranged slidably inside the cylinder, and an input chamber and an output chamber defined by the piston are formed in the cylinder, wherein the connection flow channel is connected to the input chamber, the second system is connected to the output chamber, and the control unit configured to execute the specific control until a volume of the output chamber becomes the minimum in response to the determination.

2. The vehicle braking device according to claim 1, wherein the control unit configured to execute the specific control in a period of time set based on the maximum volume of the output chamber.

3. The vehicle braking device according to claim 1, further comprising:

a solenoid valve provided in the connection flow channel, wherein the control unit configured to control the solenoid valve so that a fluid amount passing through the solenoid valve is reduced as the specific control in response to the determination.

4. The vehicle braking device according to claim 2, further comprising:

a solenoid valve provided in the connection flow channel, wherein the control unit configured to control the solenoid valve so that a fluid amount passing through the solenoid valve is reduced as the specific control in response to the determination.

* * * * *